United States Patent
Lee et al.

(10) Patent No.: US 7,197,392 B2
(45) Date of Patent: Mar. 27, 2007

(54) METHOD FOR DETECTING MAP MATCHING POSITION OF VEHICLE IN NAVIGATION SYSTEM

(75) Inventors: Han Sung Lee, Seoul (KR); Mun Ho Jung, Seoul (KR); Dong Hoon Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 130 days.

(21) Appl. No.: 10/964,028

(22) Filed: Oct. 12, 2004

(65) Prior Publication Data
US 2005/0085995 A1 Apr. 21, 2005

(30) Foreign Application Priority Data
Oct. 20, 2003 (KR) ............ 10-2003-0072906

(51) Int. Cl.
*G01C 21/00* (2006.01)
*G01C 21/30* (2006.01)

(52) U.S. Cl. ............... 701/208; 340/995.25
(58) Field of Classification Search ............. None
See application file for complete search history.

(56) References Cited

U.S. PATENT DOCUMENTS

| | | | | |
|---|---|---|---|---|
| 5,919,245 | A * | 7/1999 | Nomura | 701/207 |
| 5,928,305 | A * | 7/1999 | Nomura | 701/207 |
| 6,178,377 | B1 * | 1/2001 | Ishihara et al. | 701/200 |
| 6,335,695 | B1 | 1/2002 | Kawasaki | |
| 6,453,235 | B1 * | 9/2002 | Endo et al. | 701/211 |
| 2002/0065603 | A1 * | 5/2002 | Watanabe et al. | 701/207 |
| 2002/0072849 | A1 | 6/2002 | Kouichi et al. | |
| 2002/0111738 | A1 * | 8/2002 | Iwami et al. | 701/211 |
| 2002/0177950 | A1 | 11/2002 | Bryan | |

FOREIGN PATENT DOCUMENTS

| | | |
|---|---|---|
| EP | 0 339 639 A2 | 4/1989 |
| EP | 1233 251 A2 | 8/2002 |
| JP | 05-60565 * | 3/1993 |

* cited by examiner

*Primary Examiner*—Michael J. Zanelli
(74) *Attorney, Agent, or Firm*—Lee, Hong, Degerman, Kang & Schmadeka

(57) ABSTRACT

The present invention relates to a method for detecting a map matching position of a vehicle in a navigation system, wherein coordinates of a current vehicle location are obtained from navigation messages received by a GPS receiver using a general line equation for obtaining an intersection point between an arbitrary line and a perpendicular line drawn from an arbitrary point to the line, and the current vehicle location is matched to coordinates found through orthogonal projection on a link on a digital map closest to the obtained coordinates of the current vehicle location. The current vehicle location is detected from the navigation messages received by the GPS receiver, the detected current vehicle location is matched on the digital map to obtain coordinates $P_0$ of the current vehicle location, the digital map is searched to find a road link closest to the obtained coordinates $P_0$ of the current vehicle location, coordinates $P_1$ and $P_2$ of both end points of the searched road link are obtained, the orientation of line $\overline{P_1P_2}$ defined by the coordinates $P_1$ and $P_2$ of the obtained road link is checked on the digital map, coordinates P of an intersection point of a perpendicular line drawn from the obtained coordinates $P_0$ to line $\overline{P_1P_2}$ are obtained, and the current vehicle location is matched to the obtained coordinates P of the intersection point.

5 Claims, 4 Drawing Sheets

METHOD FOR DETECTING MAP MATCHING POSITION OF VEHICLE IN NAVIGATION SYSTEM

BACKGROUND OF THE INVENTION

1. Field of the Invention

The present invention relates to a navigation system, and more particularly, to a method for detecting a map matching position of a vehicle in a navigation system, which detects coordinates on a link (road) of map data that will be matched to coordinates of a current vehicle location obtained from navigation messages received by a GPS (global positioning system) receiver and from detection signals of a variety of sensors installed at a vehicle to detect a travel state of the vehicle.

More specifically, the present invention relates to a method for detecting a map matching position of a vehicle in a navigation system, wherein coordinates of a current vehicle location are obtained from navigation messages received by a GPS receiver and from signals of sensors installed at a vehicle, using a general line equation for obtaining an intersection point between an arbitrary line and a perpendicular line drawn from an arbitrary point to the line, and the current vehicle location is matched to coordinates found through orthogonal projection on a link on map data closest to the obtained coordinates of the current vehicle location.

2. Description of the Related Art

Generally, a navigation system obtains coordinates of a current vehicle location using navigation messages transmitted by a plurality of GPS satellites arranged on geostationary orbits over the Earth and using detection signals of a plurality of sensors installed at a vehicle, including a gyro sensor for detecting a travel direction of the vehicle and a speed sensor for detecting a travel speed, matches the obtained coordinates of the current vehicle location to map data, searches for a travel path from the matched coordinates of the current vehicle location to coordinates of a destination of the vehicle through the map data, and guides the travel of the vehicle to the destination along the searched travel path.

In such a navigation system, the coordinates of the current vehicle location obtained from the navigation messages received by the GPS receiver and the detection signals of the sensors should be exactly matched to a link on the map data in order to correctly detect the coordinates of the current vehicle location, inform a user of the detected coordinates, correctly search for the travel path from the coordinates of the current vehicle location to the coordinates of the destination, and guide the vehicle along the searched travel path.

A conventional technique for matching coordinates of a current vehicle location to coordinates of a link on map data is disclosed in Korean Patent Application No. 1997-78443 (Laid-Open Publication No. 1999-58343). According to the conventional technique, coordinates of a current vehicle location is detected and it is determined whether the detected coordinates of the current vehicle location fall within an interpolation range of a link on map data. If it is determined that the detected coordinates of the current vehicle location fall within the interpolation range of the link on the map data, a distance between coordinates of interpolated points positioned in the interpolation range and the coordinates of the current vehicle location is calculated. The coordinates of an interpolated point in which the calculated distance is smallest are selected as coordinates of a target interpolation point. Then, the coordinates of the current vehicle location are substituted with and matched to the coordinates of the selected target interpolation point. In such a manner, a travel path of the vehicle is tracked.

However, since the conventional technique substitutes the coordinates of the current vehicle location with the coordinates of the interpolated point on a link without searching for correct coordinates on the link of the map data to be matched to the coordinates of the current vehicle location, there is a problem in that it is not possible to correctly search for coordinates of an interpolated point to be matched to the coordinates of the current vehicle location if the coordinates of the current vehicle location exist between coordinates of two adjacent interpolated points.

SUMMARY OF THE INVENTION

An object of the present invention is to provide a method for detecting a map matching position of a vehicle in a navigation system, wherein coordinates of a point existing on a link of map data, which are closest to coordinates of a current vehicle location, are calculated using a general line equation for obtaining an intersection point between an arbitrary line and a perpendicular line drawn from an arbitrary point to the line.

According to an aspect of the present invention for achieving the object, there is provided a method for detecting a map matching position of a vehicle in a navigation system, comprising the steps of (a) obtaining coordinates $P_0$ of a current vehicle location; (b) searching map data to find one link to which the coordinates $P_0$ of the current vehicle location obtained in step (a) will be matched; (c) drawing a perpendicular line from the coordinates $P_0$ of the current vehicle location obtained in step (a) to the link found in step (b) and obtaining coordinates P of an intersection point of the perpendicular line; and (d) determining the coordinates of the current vehicle location to be the coordinates P of the intersection point obtained in step (c).

The coordinates $P_0$ of the current vehicle location obtained in step (a) may be coordinates of a location detected using navigation messages received by a GPS receiver and detection signals of sensors installed on the vehicle. The link found in step (b) may be a link on the map data closest to the coordinates $P_0$ of the current vehicle location.

According to another aspect of the present invention, there is provide a method for detecting a map matching position of a vehicle in a navigation system, comprising the steps of (a) obtaining, by a control unit, coordinates $P_0$ of a current vehicle location using navigation messages received by a GPS receiver and detection signals of sensors installed on the vehicle; (b) searching map data to find one link to which the coordinates $P_0$ of the current vehicle location obtained in step (a) will be matched, and obtaining coordinates $P_1$ and $P_2$ of both end points of the link; (c) obtaining coordinates P of an intersection point of a perpendicular line $\overline{PP_0}$ drawn from the coordinates $P_0$ of the current vehicle location obtained in step (a) to a line $\overline{P_1P_2}$ defined by the coordinates $P_1$ and $P_2$ of the both end points of the link obtained in step (b); and (d) determining the coordinates of the current vehicle location to be the coordinates P of the intersection point obtained in step (c).

The link found in step (b) may be a link on the map data closest to the coordinates $P_0$ of the current vehicle location.

Step (c) may further comprise the steps of determining an orientation of the line $\overline{P_1P_2}$ defined by the coordinates $P_1$ and $P_2$ of the both end points of the link obtained in step (b); and obtaining the coordinates P of the intersection point of the perpendicular line according to the determined orientation. If the orientation of the line $\overline{P_1P_2}$ is not vertical or horizontal on a digital map, the coordinates P of the intersection point of the perpendicular line may be calculated from the following formula:

$$\begin{pmatrix} p \\ q \end{pmatrix} = \frac{1}{a'b - ab'} \begin{pmatrix} b'c - bc' \\ c'a - ca' \end{pmatrix}.$$

If the orientation of the line $\overline{P_1P_2}$ is vertical on a digital map, the coordinates P of the intersection point of the perpendicular line may be determined to be $(x_1, y_0)$. If the orientation of the line $\overline{P_1P_2}$ is horizontal on a digital map, the coordinates P of the intersection point of the perpendicular line may be determined to be $(x_0, y_1)$.

Here, p and q are x- and y-axis coordinate values of the coordinates P of the intersection point of the perpendicular line, respectively, and a, b, c, a', b' and c' are coefficients of an equation for line $\overline{P_1P_2}$ ax+by+c=0, and an equation for line $\overline{P_1P_2}$ a'x+b'y+c'=0. $x_1$ is x-axis coordinate values of the coordinates $P_1$ and $P_2$, and $y_0$ is a y-axis coordinate value of the coordinates $P_0$. $x_0$ is an x-axis coordinate value of the coordinates $P_0$, and $y_1$ is y-axis coordinate values of the coordinates $P_1$ and $P_2$.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE INVENTION

Hereinafter, a method of detecting a map matching position of a vehicle in a navigation system according to the present invention will be described in detail with reference to accompanying drawings.

Figure 1:
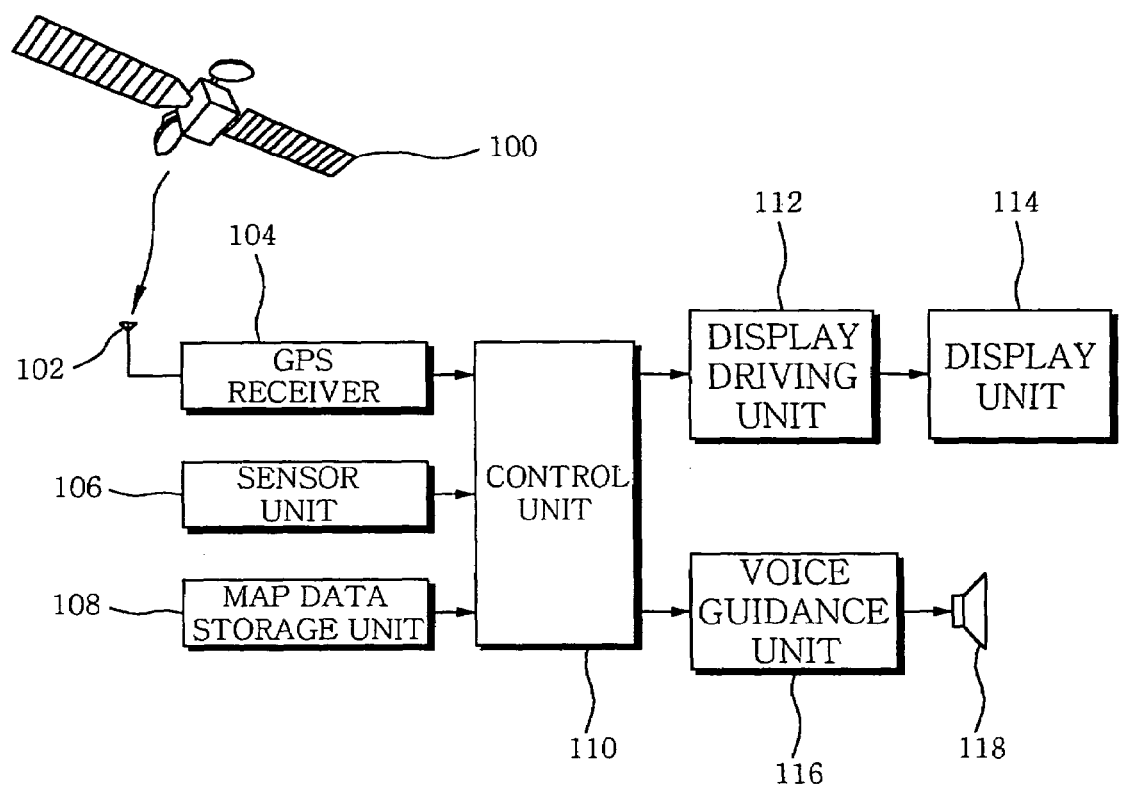
FIG. 1 is a block diagram showing a configuration of a navigation system to which a method of detecting a map matching position according to the present invention is applied.

FIG. 1 is a block diagram showing a configuration of a navigation system to which the method of detecting the map matching position according to the present invention is applied. As shown in the figure, the navigation system comprises a GPS receiver 104 for receiving navigation messages, which have been transmitted by a plurality of GPS satellites 100, through an antenna 102; a sensor unit 106 installed at a vehicle to detect a travel direction, a travel speed and the like of a vehicle; a map data storage unit 108 for storing map data in a storage medium such as a compact disk or a memory; a control unit 110 capable of controlling operations for detecting coordinates of a current vehicle location from the navigation messages received by the GPS receiver 104 and detection signals of the sensor unit 106, for matching the detected coordinates of the current vehicle location to a link on map data stored in the map data storage unit 108 and for searching a travel path from the matched position to coordinates of a destination of the vehicle so as to guide the travel of the vehicle; a display driving unit 112 for causing the current vehicle location together with a map to be displayed on a display unit 114 under the control of the control unit 110; and a voice guidance unit 116 for guiding the travel of the vehicle using voices through a speaker 118 under the control of the control unit 110.

When the vehicle travels, the GPS receiver 102 of the navigation system constructed as above receives the navigation messages transmitted by the plurality of GPS satellites 100 and inputs them into the control unit 110, and the sensor unit 106 detects a travel state, including a travel direction and a travel speed of the vehicle, and inputs it into the control unit 110.

Then, the control unit 110 detects the coordinates of the current vehicle location using the navigation messages received by the GPS receiver 102 and the detection signals of the sensor unit 106, matches the detected coordinates of the current vehicle location to a link on the map data stored in the map data storage unit 108, and outputs the matched results to the display unit 114 through the display driving unit 112 to display the map and the current vehicle location.

When a user of the vehicle sets coordinates of a destination to which the vehicle will travel, the control unit 110 searches the map data to find a travel path to the coordinates of the destination from the coordinates of the link on the map data to which the current vehicle location has been matched, and causes the searched travel path together with a map to be displayed on the display unit 114 through the display driving unit 112 and guidance voices to be simultaneously output from the speaker 118 through the voice guidance unit 116, thereby guiding the vehicle along the travel path.

Figure 2:
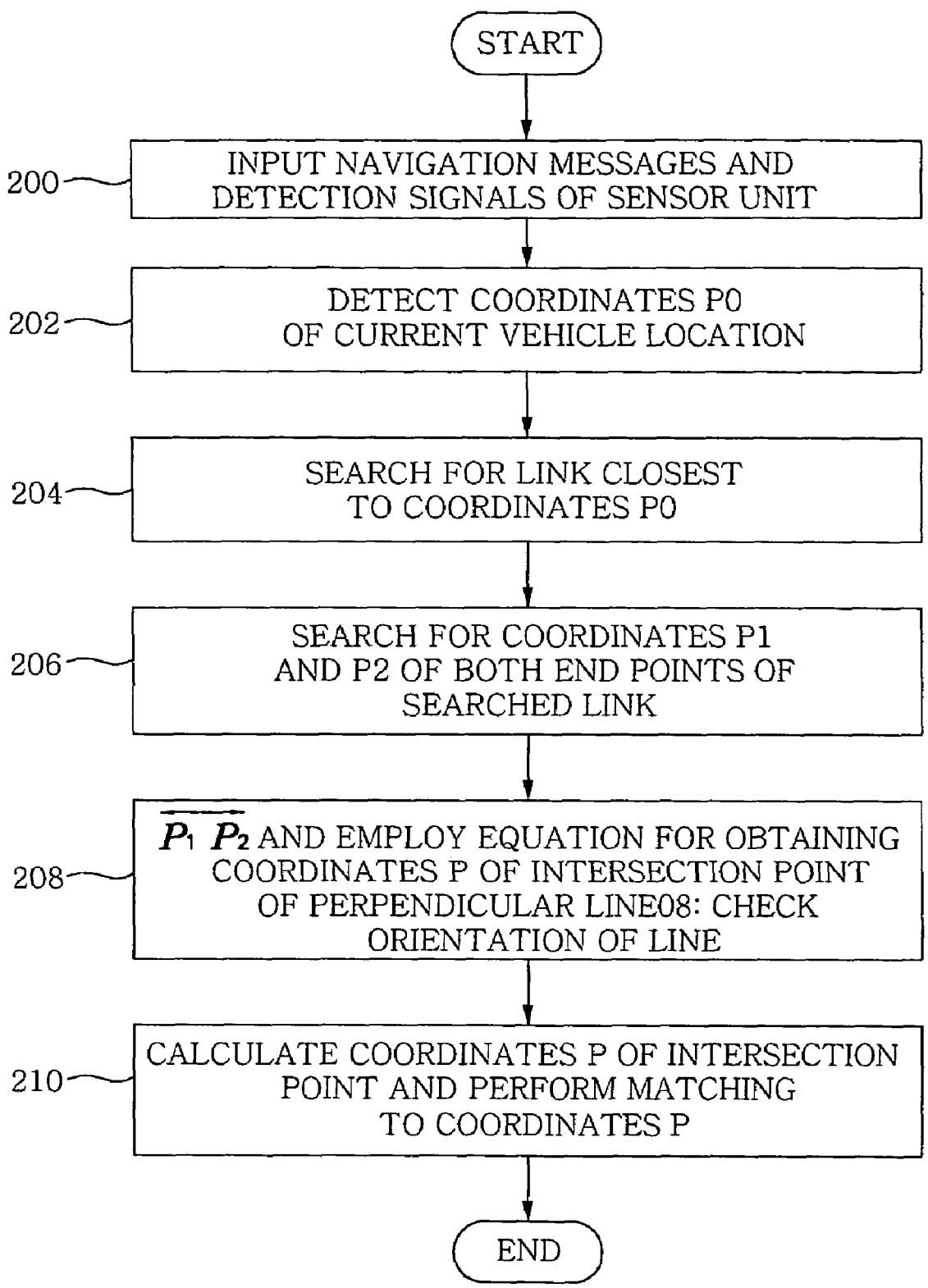
FIG. 2 is a flowchart illustrating the method of detecting the map matching position according to the present invention.

FIG. 2 is a flowchart illustrating the method of detecting the map matching position according to the present invention. As shown in the figure, the control unit 110 receives navigation messages received by the GPS receiver 104 and detection signals of the sensor unit 106 (step 200), and detects coordinates $P_0$ of a current vehicle location using the received navigation messages and detection signals of the sensor unit 106 (step 202).

The control unit 110 searches the map data stored in the map data storage unit 108 to find a link closest to the detected coordinates $P_0$ of the current vehicle location (step 204), and searches for and stores coordinates $P_1$ and $P_2$ of both end points of the searched link (step 206).

The control unit 110 checks the orientation of a line $\overline{P_1P_2}$ defined by the coordinates $P_1$ and $P_2$ of the both end points of the detected link (road) (step 208), and obtains coordinates P of an intersection point of a perpendicular line drawn from the detection coordinates $P_0$ of the current vehicle location to line $\overline{P_1P_2}$ using a formula for obtaining the coordinates P of the intersection point, determines the obtained coordinates P of the intersection point of the perpendicular line as correct coordinates of the current vehicle location and performs matching (step 210).

Figure 3:
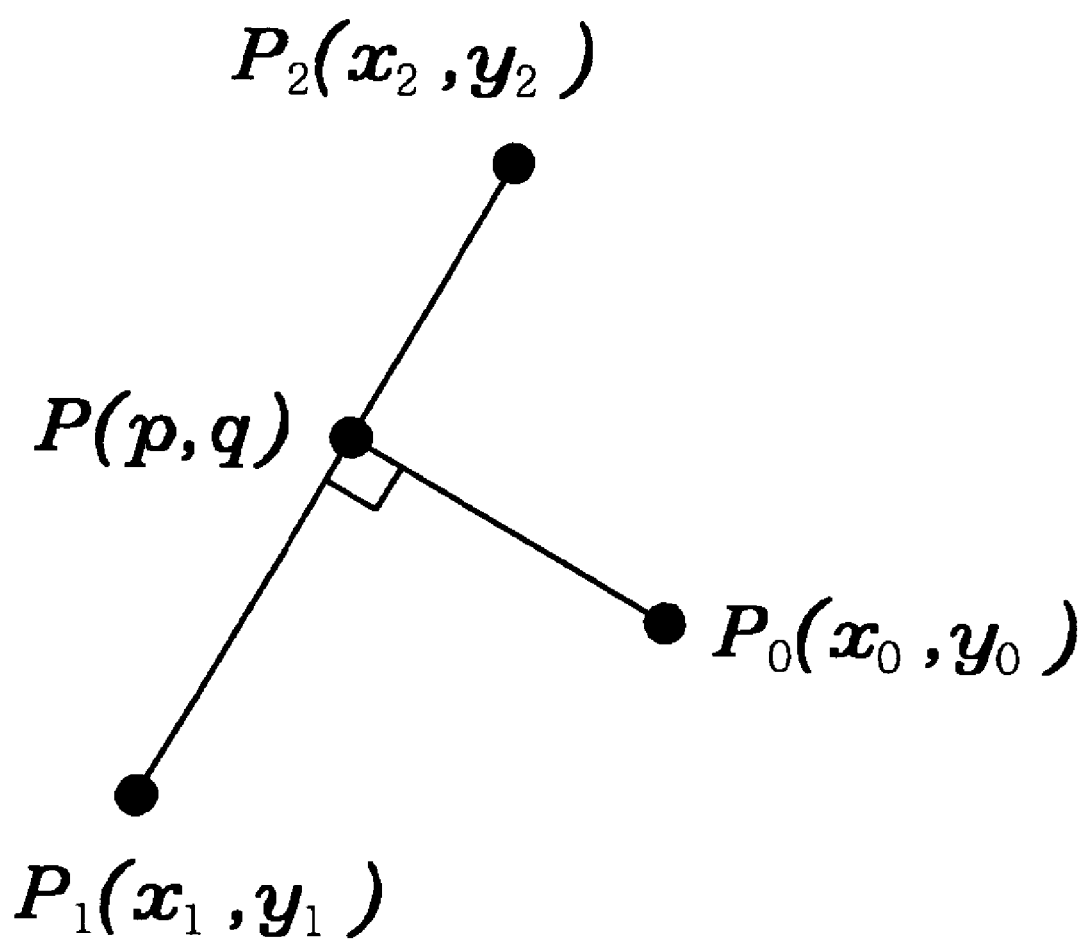
FIGS. 3 to 5 are views illustrating operations for obtaining an intersection point of a perpendicular line in the method of detecting the map matching position according to the present invention.
Figure 4:
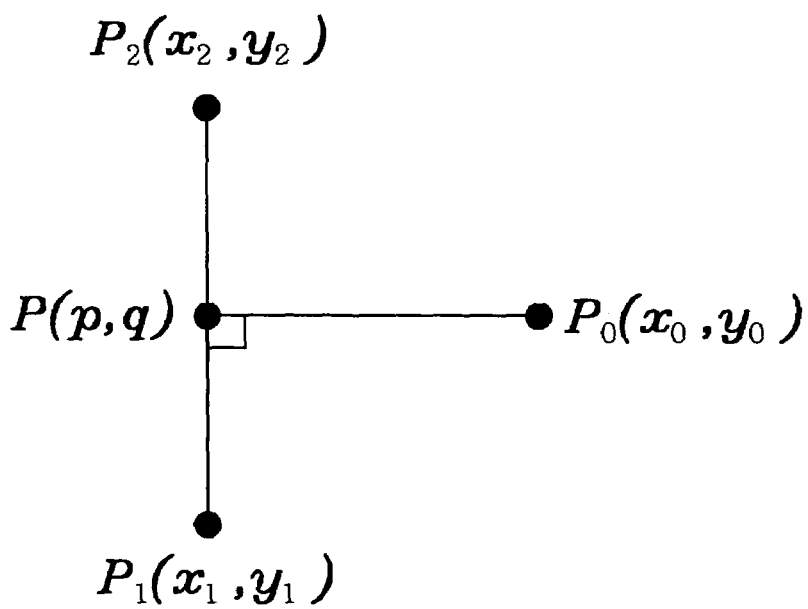
Figure 5:
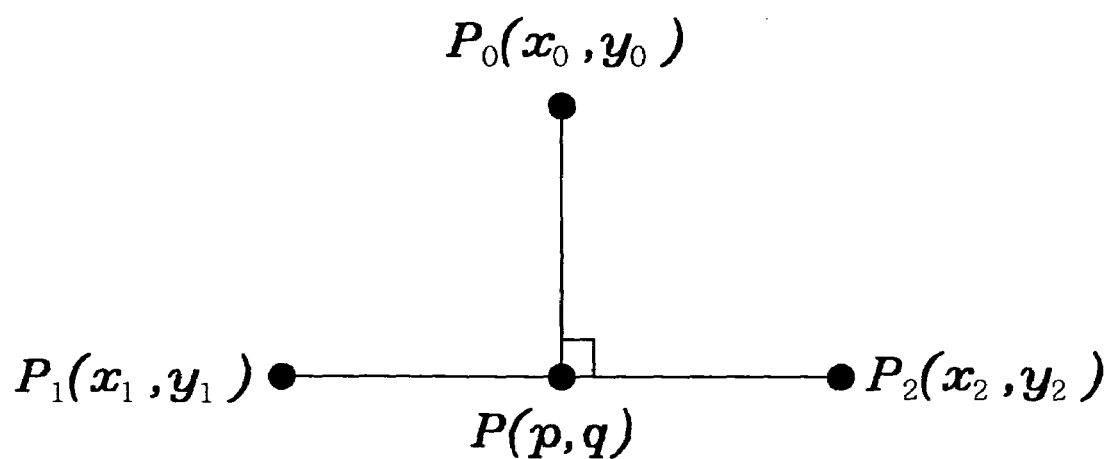

Next, the operation for obtaining the coordinates P of the intersection point of the perpendicular line drawn from the coordinates $P_0$ of the current vehicle location to line $\overline{P_1P_2}$ will be described in detail with reference to FIGS. 3 to 5.

A line equation of which a gradient is m and a y-intercept is n is expressed as the flowing formula 1:

$$y = mx + n \qquad (1)$$

In the line equation expressed as formula 1, a line parallel with the y-axis cannot be expressed since the value of the gradient m approaches infinite as the orientation of a line becomes closer to a vertical line.

Therefore, the line equation expressed as formula 1 cannot be used for obtaining the coordinates P of the intersection point of the perpendicular line drawn from the coordinates $P_0$ of the current vehicle location to line $\overline{P_1P_2}$. Accordingly, a general line equation expressed as the following formula 2 should be used:

$$ax+by+c=0 \qquad (2)$$

If b=0 in formula 2, a line parallel with the y-axis can be expressed as a line equation. Thus, it can be understood that formula 2 is more general then formula 1 expressed using the gradient and the y-intercept.

To obtain an intersection point of a perpendicular line, line equations for lines $\overline{P_1P_2}$ and $\overline{P_0P}$ are defined herein as the following formulas 3 and 4:

$$\overline{P_1P_2} \Rightarrow ax+by+c=0 \qquad (3)$$

$$\overline{P_0P} \Rightarrow a'x+b'y+c'=0 \qquad (4)$$

The orientation of line $\overline{P_1P_2}$ may correspond to one of a vertical case, a horizontal case, and cases other than the vertical and horizontal cases. The obtainment of the coordinates P of the intersection point of the perpendicular line will be described according to the orientation of line $\overline{P_1P_2}$.

1. A case where line $\overline{P_1P_2}$ is vertical (a≠0, b=0) (see FIG. 4)

In the equation for line $\overline{P_1P_2}$, x-axis coordinate values $x_1$ and $x_2$ of $P_1$ and $P_2$ are identical with each other ($x_1=x_2$). In the equation for line $\overline{P_0P}$, $y=y_0$. Therefore, the coordinates P of the intersection point of the perpendicular line for connecting the two lines $\overline{P_1P_2}$ and $\overline{P_0P}$ are ($x_1$, $y_0$).

2. A case where line $\overline{P_1P_2}$ is horizontal (a=0, b≠0) (see FIG. 5)

In the equation for line $\overline{P_1P_2}$, y-axis coordinate values $y_1$ and $y_2$ of $P_1$ and $P_2$ are identical with each other ($y_1=y_2$). In the equation for line $\overline{P_0P}$, $x=x_0$. Therefore, the coordinates P of the intersection point of the perpendicular line for connecting the two lines $\overline{P_1P_2}$ and $\overline{P_0P}$ are ($x_0$, $y_1$).

3. A case where line $\overline{P_1P_2}$ is not vertical or horizontal (a≠0, b≠0) (see FIG. 3)

Assuming that the coordinates P of the intersection point of the perpendicular line for connecting the two lines $\overline{P_1P_2}$ and $\overline{P_0P}$ are (p, q), the following formula 5 is established:

$$\begin{pmatrix} a & b \\ a' & b' \end{pmatrix}\begin{pmatrix} p \\ q \end{pmatrix} = -\begin{pmatrix} c \\ c' \end{pmatrix} \qquad (5)$$

The coordinates P of the intersection point of the perpendicular line, i.e. (p, q), are obtained by arranging formula 5 as expressed in the following formula 6:

$$\begin{pmatrix} p \\ q \end{pmatrix} = -\begin{pmatrix} a & b \\ a' & b' \end{pmatrix}^{-1}\begin{pmatrix} c \\ c' \end{pmatrix} = \qquad (6)$$

-continued $$\frac{1}{a'b-ab'}\begin{pmatrix} b' & -b \\ -a' & a \end{pmatrix}\begin{pmatrix} c \\ c' \end{pmatrix} = \frac{1}{a'b-ab'}\begin{pmatrix} b'c-bc' \\ c'a-ca' \end{pmatrix}$$

Here, since lines $\overline{P_1P_2}$ and $\overline{P_0P}$ are not parallel with each other and both of a and b are not 0, $$\frac{a'}{a} \neq \frac{b'}{b}.$$

Therefore, since a'b−ab'≠0, there exists an inverse matrix.

Thus, it can be understood that the coordinates P of the intersection point of the perpendicular line, i.e. (p, q), are dependent on the coefficients a, b, c, a', b' and c' of the line equations.

Generally, even when both sides of a line equation are multiplied by an arbitrary number other than 0, the equation is established as well. That is, even though the line equation for line $\overline{P_1P_2}$ is multiplied by a constant k other than 0, this represents the same line equation as line $\overline{P_1P_2}$ like the following formula 7:

$$\overline{P_1P_2} \Rightarrow kax+kby+kc=0 (k\neq 0) \qquad (7)$$

Therefore, one of the coefficients of the line equation can be fixed to a specific value.

Here, assume that b of the coefficients of the line equation for line $\overline{P_1P_2}$ is −1, and b' of the coefficients of the line equation for line $\overline{P_0P}$ is −1, as shown in formula 8:

$$b=b'=-1 \qquad (8)$$

Then, the following formulas 9 and 10 can be obtained for lines $\overline{P_1P_2}$ and $\overline{P_0P}$:

$$\overline{P_1P_2} \Rightarrow y=ax+c \qquad (9)$$

$$\overline{P_0P} \Rightarrow y=a'x+c' \qquad (10)$$

Since the coordinates $P_1(x_1, y_1)$ and $P_2(x_2, y_2)$ correspond to points on line $\overline{P_1P_2}$, the substitution of the coordinates $P_1$ and $P_2$ of the two points into formula 9 results in a relational expression like the following formula 11:

$$\begin{pmatrix} x_1 & 1 \\ x_2 & 1 \end{pmatrix}\begin{pmatrix} a \\ c \end{pmatrix} = \begin{pmatrix} y_1 \\ y_2 \end{pmatrix} \qquad (11)$$

When formula 11 is arranged and the coefficients a and c are calculated, the following formula 12 is obtained:

$$\begin{pmatrix} a \\ c \end{pmatrix} = \begin{pmatrix} x_1 & 1 \\ x_2 & 1 \end{pmatrix}^{-1}\begin{pmatrix} y_1 \\ y_2 \end{pmatrix} \qquad (12)$$

$$= \frac{1}{x_1-x_2}\begin{pmatrix} 1 & -1 \\ -x_2 & x_1 \end{pmatrix}\begin{pmatrix} y_1 \\ y_2 \end{pmatrix}$$

$$= \frac{1}{x_1-x_2}\begin{pmatrix} y_1-y_2 \\ x_1y_2-x_2y_1 \end{pmatrix}$$

Here, since line $\overrightarrow{P_1P_2}$ is not parallel with the y-axis, $x_1-x_2\neq 0$ and there exists an inverse matrix.

Since the two lines $\overrightarrow{P_1P_2}$ and $\overrightarrow{P_0P}$ are perpendicular to each other, the coefficient a' can be obtained from the following equation 13:

$$\overrightarrow{P_1P_2} \perp \overrightarrow{P_0P} \Rightarrow \left(-\frac{a}{b}\right) \times \left(-\frac{a'}{b'}\right) = \frac{aa'}{bb'} = -1, aa' = -1 \quad (13)$$

$$a' = -\frac{1}{a} = -\frac{x_1-x_2}{y_1-y_2}, \text{ where } y_1 \neq y_2.$$

Here, since line $\overrightarrow{P_1P_2}$ is not parallel with the x-axis, $y_1-y_2\neq 0$.

Meanwhile, since the coordinates $P_0$ correspond to a point existing on line $\overrightarrow{P_0P}$, the following formula 14 can be obtained by substituting the coordinates $P_0$, i.e. $(x_0, y_0)$, into formula 10 which in turn will be arranged:

$$y_0 = a'x_0 + c' \quad (14)$$

$$c' = y_0 - a'x_0 = y_0 + \frac{x_1-x_2}{y_1-y_2}x_0 = \frac{y_0y_1 - y_2y_0 + x_0x_1 - x_2x_0}{y_1-y_2}$$

When the values of the coefficients obtained as such are substituted into formula 6, it is possible to obtain the coordinates P of the intersection point of the perpendicular line drawn from the coordinates $P_0$ of the current vehicle location to line $\overrightarrow{P_1P_2}$.

As described above, according to the present invention, coordinates of a current vehicle location is found on a map, a perpendicular line is drawn from the coordinates of the current vehicle location to a link closest thereto by using a general line equation, coordinates of an intersection point of the perpendicular line are found, and the current vehicle location is matched to the coordinates of an intersection point, thereby matching the current vehicle location to a correct position on the link. Accordingly, it is possible to more correctly inform a user of the current vehicle location and to guide the travel of the vehicle by more correctly searching for a travel path of the vehicle.

Although the present invention has been illustrated and described in connection with the preferred embodiment, it will be readily understood by those skilled in the art that various adaptations and changes can be made thereto without departing from the spirit and scope of the present invention defined by the appended claims.

What is claimed is:

1. A method for detecting a map matching position of a vehicle in a navigation system, comprising the steps of:
   (a) obtaining, by a control unit, coordinates ($P_0$) of a current vehicle location using navigation messages received by a GPS receiver and detection signals of sensors installed on the vehicle;
   (b) searching map data to find one link to which the coordinates ($P_0$) of the current vehicle location obtained in step (a) will be matched, and obtaining coordinates ($P_1$, $P_2$) of both end points of the link;
   (c) putting the coordinates ($P_0$) of the current vehicle location and the coordinates ($P_1$, $P_2$) of both end points of the link into a predetermined formula to obtain coordinates (P) of an intersection point of the perpendicular line connecting perpendicular line ($\overrightarrow{P_0P}$) to a line ($\overrightarrow{P_1P_2}$) defined by the coordinates ($P_1$, $P_2$) of both end points of the link obtained in step (b); and
   (d) determining the coordinates of the current vehicle location to be the coordinates (P) of the intersection point obtained in step (c).

2. The method as claimed in claim 1, wherein the link found in step (b) is a link on the map data closest to the coordinates ($P_0$) of the current vehicle location.

3. The method as claimed in claim 1, wherein the coordinates (P) of the intersection point obtained in step (c) are calculated from the following formula:

$$\begin{pmatrix} p \\ q \end{pmatrix} = \frac{1}{a'b-ab'} \begin{pmatrix} b'c-bc' \\ c'a-ca' \end{pmatrix}$$

where p and q are x- and y-axis coordinate values of the coordinates (P) of the intersection point obtained in step (c), respectively, and a, b, c, a', b' and c' are coefficients of an equation for line ($\overrightarrow{P_1P_2}$), ax+by+c=0, and an equation for line ($\overrightarrow{P_0P}$), a'x+b'y+c'=0.

4. The method as claimed in claim 1, wherein if the orientation of the line ($\overrightarrow{P_1P_2}$) is vertical on a digital map, the coordinates (P) of the intersection point obtained in step (c) is determined to be ($x_1$, $y_0$), where $x_1$ is x-axis coordinate values of the coordinates ($P_1$, $P_2$), and $y_0$ is a y-axis coordinate value of the coordinates ($P_0$).

5. The method as claimed in claim 1, wherein if the orientation of the line ($\overrightarrow{P_1P_2}$) is horizontal on a digital map, the coordinates (P) of the intersection point obtained in step (c) is determined to be ($x_0$, $y_1$), where $x_0$ is an x-axis coordinate value of the coordinates ($P_0$), and $y_1$ is y-axis coordinate values of the coordinates ($P_1$, $P_2$).

* * * * *